Patented Jan. 26, 1954

2,667,417

UNITED STATES PATENT OFFICE 2,667,417

PURIFICATION AND STABILIZATION OF FRUIT JUICES BY ION EXCHANGE TREATMENT

Georges Delmousée, Geza Victor Austerweil, Georges Lemoussu, and Jean Claude Poupinel, Paris, France No Drawing. Application October 19, 1951, Serial No. 252,186

3 Claims. (Cl. 99—105)

The treatment of various juices of plant origin, such as beet-root juice, and fruit juices in general with ion exchange materials has been known for several decades (see French Pat. No. 832,866, 842,115). However the numerous later patents in this field have not been practically utilized in plant application because the purification results obtained by these prior art processes have been more or less incomplete and therefore unsatisfactory.

According to the prior art, these plant juices are treated by filtering them first through a cation exchanger bed in its hydrogen phase, where all the cations present in the liquid are exchanged against hydrogen; this treatment being followed by a passage of the thus acidified liquid through an anion exchanger bed, which retains all of the anions, i. e. the free acids of the juices. No difference in the retention of the various anions has been attempted by the two ion exchange treatments in the prior art, nor obtained in this prior art.

The comparatively low polarity of most of the known ionic exchangers necessitates a certain contact time for the elimination of the respective ions from the liquids; this often results in an undesirable transformation, exchange or elimination of certain useful constituents of the processed liquids, for example, during the inversion of saccharose in the beet-sugar juice, by too long a contact time with the cation exchanger there is liberated too much free hydrogen ions; also, the flattening of taste in wines by anion exchangers results from excessive deacidification which is caused by a prolonged contact time.

It has been found, according to the present invention, that new and very satisfactory results are obtained for the purification, clarification and stabilization of fermentable fruit juices in a stage prior to the aging of these juices, particularly, wines, ciders, fruit juices, etc. by passing the impure fruit juice through a synthetic cation exchanger such as after-sulfonated polystyrene cross-linked with up to 10% divinyl benzene, after-sulfonated polystyrene cross-linked allyl esters of unsaturated dicarboxylic acids and polyvinyl sulfonates obtained by the oxidation of copolymers of alkoyl vinyl sulfides and sulfones, and thereby removing heavy metal ions, precipitable potassium bitartrate and precipitable calcium tartrate to leave in the treated juice a molar ratio of potassium to calcium ions of about 4 to 1 at a low pH of about 2, whereafter the juice is passed through a synthetic resin cation exchanger such as a ternary alkenyl ammonium polystyrene, a quaternary alkenyl ammonium polystyrene, mixtures of ternary alkylamino-polystyrene cross linked with alkylamino-polystyrene and mixtures of alkenyl ammonium polystyrene cross-linked with alkylamino-polystyrene to remove the carboxylic acid and bisulfite impurities from the juice and to raise the pH to above a pH of about 3. The process of the invention overcomes the prior art difficulties by applying the recently ascertained selectivity of the ion exchangers in general (see C. R. Acad. d. Sc., vol. 232, 1951, pages 1481–1483) in a new and surprisingly useful manner so that a selected portion of the undesirable constituents of the processed liquids may be eliminated, without interfering unduly with the presence of necessary or useful constituents which condition the flavor, odor and stability of the resulting wine or juice.

These new and unexpectedly useful results are obtained by the combination of the process features which utilize particular ion exchangers and which shorten the contact time between the exchanger and liquid treated. The contact time is adapted for the specific exchanger and for the composition of the liquid in view of the stabilization and partial purification result which is necessary.

It has been found, in general, that better results in purification are obtained when ion exchangers are used which are high polymers in which the polar (acid or basic) groups are introduced after polymerisation. Less effective are the ion exchangers which are produced by condensation of initially acid or basic products (for example, sulfonated phenols or substituted amines) with oxygenated derivatives, followed by polymerisation. These latter require longer contact times and are less selective so as to eliminate the necessary and useful ions from the treated juices together with the impurities.

The controlled regulation of the correct contact time for the processing with cation exchangers is necessary in order to obtain a far reaching elimination of the heavy metal cations, Fe and Cu, and the alkaline-earth metal-cations from these liquids, the former causing decoloration as well as an objectionable taste, and the latter being preferentially used in the metabolism of the infection causing micro-organisms (*Bacillus aceticus, Mycoderma vini*, etc.). The alkali-metal cations are only eliminated up to a certain value. The alkali metal cations are not completely removed but are partly retained in the solution in a sufficient amount to maintain the typical taste and character of the fruit juice.

One group of useful cation exchangers for this purpose are, for example, the after-sulfonated polystyrenes which are not extensively cross-linked; another group consists of polyvinylsulfonates obtained after oxidation of copolymers of alkoyl-vinyl sulphides and/or sulfones (see Cope Morrison and Field, J. S. C. S. 1950, page 59), and polystyrene (J. A. C. S. 1950, LXXII, pages 14–17). Sulfonated polystyrenes have already been proposed for the treatment of wines and fruit juices (applicants' French patent application Serial No. 594,685 of July 31, 1950), but their composition and their selectivity are important factors; if they are too much cross-linked, by virtue of their cross-linking copolymers, then the absorptive capacity and absorption rate tend to diminish so that with more than 10% divinylbenzene as a cross-linker the absorption capacity becomes too low, and the speed of ion absorption is inadequate. These excessively cross-linked cation exchangers act towards wines in the same manner as aldehyde-condensed sulfonic resins, that is the necessary contact time is too long. If the amount of cross-linking copolymer is too low, the rate of ion exchange in these exchangers at the regeneration-phase with sulfuric acid and rinsing afterwards will either be inadequate or require too much replenishment and cause a diminution of the cross-section of the exchanger-bed, or even a solubilisation of the acid exchanger itself. This can be counteracted by modifying the resin exchanger by means of an adequate cross-linker, such as acid allyl- or methallyl-esters of dicarboxylic acids (adipic, sebacic acids and the like), or an acid ester obtained with unsaturated dicarboxylic acids such as fumaric and citraconic acids. The best selectivity is observed when a copolymer of divinyl benzene and these dicarboxylic esters is after-sulfonated, giving two copolymerisation centers in the molecule.

In a similar manner, the contact time for anion exchangers has to be equally selectively adapted, and shortened particularly to prevent undue loss of useful acidity, which loss gives rise to a disagreeable taste and results in flatness. This result can be obtained by applying such anion exchangers of the above-mentioned class which contain a mixture of hitherto unused N-substituted amino-polystyrenes which consist of ternary or quaternary alkenyl-ammonium styrene polymers, such as N-substituted amino-polystyrenes which have an allyl or methallyl-group on the nitrogen atom and the former in admixture with a poly-alkylamino-styrene. These products have two distinct cross linking groups, show considerable selectivity, and provide a suitable short time of exchange contact.

The ion exchangers above indicated are examples which are suitable in accordance with the invention; their enumeration is not to be taken as limiting in the new process using the ion exchangers in the treatment described in this application.

An object of the invention is to carry out the process of purifying, clarifying and stabilizing fermentable fruit juices in a state prior to the finished state of these juices, aged or fresh, these juices containing precipitable potassium bitartrate, calcium ions, heavy metal ions, bisulfide salts and aliphatic carboxylic acids, in which the juices are rapidly passed through a synthetic cation exchanger containing after-sulfonated cross-linked polystyrene, the cross-linking limited to about 10% of divinyl benzene, this alone or copolymerized with alkyl esters of unsaturated dicarboxylic acid or the oxidized copolymers of alkoyl vinyl sulfides and sulfones, the cation exchange treatment resulting in the removal of these cation impurities with the exception of calcium, the molar ratio of calcium and potassium retained in the juice being about 4 to 1 and the pH about 2, whereafter the juice is passed through a bed of an anion resin exchanger such as a ternary alkenyl ammonium polystyrene, a quaternary alkenyl ammonium polystyrene, mixtures of these or mixtures of these cross-linked with alkyl amino polystyrene to remove by such anion exchange treatment bisulfite and carboxylic acid impurities and to obtain a pH of the so purified juice of about 3 to 4.

Other and further objects of the present invention will appear from the more detailed description set forth below, it being understood that such detailed description is given by way of illustration and explanation only and not by way of limitation, since various changes therein may be made by those skilled in the art without departing from the scope and spirit of the present invention.

In application of the thus outlined process, it has been found that it is possible to clarify and stabilize, immediately after pressing, fruit juices, young wines etc., and to remove therefrom by cation exchange treatment, substantially all of the visible precipitate of bitartrate of potash which will be formed on standing as a deposit in bottles. The fruit juices or wines are filtered through a bed of a polysulfostyrene cation exchanger as indicated above, in its hydrogen phase, at a short contact-time, varying accordingly to the composition of the wine, between 40 seconds and 1.5 minutes; in this case, only such an amount of potassium will be retained by the exchanger, which amount would crystallize, if present as potassium bitartrate by saturation of the dilute alcoholic solution represented by the wine, to form a deposit in bottles; the necessary amount of bitartrate of potash for a high quality wine is about 1.8 g. or about 365 mg./l. will remain in solution, and will not crystallize, even at relatively low temperatures. Thus, one of the chief improvements of the wine will be attained in a very short treatment. Long storage of the wine is eliminated. The deposit which usually collects during bottling is eliminated and no further deposit in bottles is to be feared. The present method obviates the use of costly refrigerating chambers, in which the crystallization of bitartrate of potash from young wines is somewhat speeded up.

The selective qualities of the cation exchanger become more prominent, when about 75% of the alkaline-earth metal cations are eliminated together with some of the nitrogen-containing higher complex bases, as the impurities to be removed. Both of these impurities are needed for the metabolism of wine-infecting micro-organisms. There are also eliminated by this treatment the heavy-metal cations, such as Fe and Cu, which are detrimental to the taste and the color of wines.

The hydrogen set free by exchange in this first stage of the treatment by the cation exchanger tends to cause a strong acid taste of the thus treated wine. This acidity is eliminated by flowing the juice through an anion exchanger of the class indicated above, in a rapid manner to restore the original pH of the wine, thus restoring its original taste.

The treatment using two different wines with cation and anion exchangers are set out in the following examples:

Example 1

Two different white wines are treated with a polysulfo-styrene cation exchanger crosslinked with 10% divinylbenzene as cross-linker.

|  | Wine I contact-time, 55 seconds | | Wine II contact-time, 40 seconds | |
|---|---|---|---|---|
|  | before exchange | after exchange | before exchange | after exchange |
| K-content: mgr./l | 756 | 396 | 524 | 360 |
| Ca-content: mgr./l | 131 | 50 | 123 | 42 |
| Fe-content | 12 | 4 | 11 | 2 |
| K-content: equ.-gr./l | 0.0193 | 0.0100 | 0.0134 | 0.0092 |
| Ca-content: equ.-gr./l | 0.065 | 0.0025 | 0.0061 | 0.0021 |
| K/Ca in weight | 5.27 | 7.93 | 4.3 | 2.57 |
| K/Ca in mols | 3 | 4 | 2.2 | 4.39 |
| Selectivity in mols K/Ca* | 0.75 | 0.75 | 0.5 | 0.5 |
| Acidity in pH | 3.4 | 2.7 | 3.1 | 2.5 |

*Selectivity is the molar ratio K/Ca before and after exchange in the liquid.

The treated wine is kept 4 months in half filled bottles thereby facilitating a test for the development of aerobic infection. The so stored wine remained clear, blank, of correct color and sterile. The wine has a pleasant natural taste. The untreated wines, kept in the same manner, for the same time, had a strong deposit, and presented a 4 mm. thick collar of *Mycoderma aceti* culture at the top level, and a pH of 1.9 and 2.1 respectively, with strong vinegary flavor.

After leaving the cation exchanger, the two wines were run with a contact time of 35 seconds through an anion exchanger bed, consisting of polymer ternary and quaternary ammonium bases (after-methylated amino-polystyrene), to reobtain a pH of 3.4 and 3.2 respectively. Taste and flavor are improved after such treatment, as well as bouquet, the latter due to the slight aldol formation from the aldehydes present in contact with the strongly basic anion exchange.

If sparkling wines are to be prepared, the ultimate running through an anion exchanger is not necessary, a pH in the neighborhood of 2.5 being that of such wines.

If wine II, which has a lesser amount of bitartrate of potash in its original form is treated with a 55 seconds' contact time, too much potassium is removed, and if wine I is treated at a 40 seconds' contact time, too much potassium remains, and after-crystallization of some bitartrate of potash is observed.

Example 2

Grape juice, containing about 195 g. sugar/l. whose fermentation was arrested by 250 mg./l. free $SO_2$ through addition of potassium metabisulfite, an adequate quantity, is run through an anion exchanger bed to obtain a reduction of free $SO_2$ to 30 mg./l. It is then caused to ferment with pure "Champagne" yeast, and immediately after the end of its fermentation, treated with cation and anion exchangers as in Example I. Kept a week at $-5°$ C. in a refrigerating chamber, it gives no bitartrate deposit and can be safely bottled, presenting a pH of 3.1 and 10.2 volume percent alcohol with a fair taste and flavor.

Example 3

Grape juice is transformed in a stable, alcoholic-free juice with good stable keeping qualities and good taste and flavor by applying the method outlined in Example 2, without intermediary fermentation. The liquid, which contains 350 mg./l. total $SO_2$ is first filtered through a cation exchanger to liberate 95% of its total $SO_2$ content as free $SO_2$ and then filtered through an anion exchanger to obtain a pH which is that of the grape juice before addition of the $SO_2$ or the metabisulfite; the average contact time, in order to obtain selectivity between the $H_2SO_3$ present and the natural acidity of the juice is about 35-45 seconds. A fruit juice of clear taste and good keeping qualities results.

Example 4

Malic acid is usually considered to be the cause of bitter taste in ciders, which ciders should retain some of their acidity to be palatable. It has been found that bitter cider may be rendered sweet and of pleasing taste, if it is first filtered with a speed of about 45 seconds through an anion exchanger of the formerly mentioned type to eliminate malic acid in excess, then through a sulfonated polystyrene cation exchanger with a contact time of about 50 seconds and finally through a freshly regenerated anion exchanger to retain part of the acidity thus formed in excess. This process confers to these ciders thus treated in good, metal-free taste and fairly good keeping qualities, preventing infection, due to the stabilizing effect of the treatment with the cation exchanger, which eliminates components favorising the proliferation of undesirable micro-organisms.

The use of the selective qualities of anion exchangers renders it possible to solve the hitherto unsolved problem of utilizing wines which became unsuitable for drinking through infection causing acetification. This sort of infection causes the formation of much volatile acids, the high content of which renders wines unsalable. After determination of both the normal and volatile acids in these wines, the normal acids, which are generally the stronger ones, are carefully neutralized with a strong alkaline solution (NaOH or KOH) which affect only very slightly the acidity of volatile acids (Henry's law), and is filtered through a strongly basic anion exchanger; the only acidity being that of the volatile acids, the contact time has to be prolonged until nearly the whole acidity is neutralized by the anion exchanger. This time may be in this case 2 minutes and even more. After this treatment, the liquid is run at the former mentioned selective speed through a cation exchanger, which will retain the alkali-metal cations introduced for neutralization of the normal acidity, and also some of the excess of the K ions liable to form undue quantities of bitartrate of potash. In this case the contact time is increased because a larger amount of alkali-metal cations are to be eliminated than in the case of normal untreated wines (about 1.5 minutes). The third phase of the treatment will then be to run the thus acidified wine with the selective contact time of 35-45 seconds, through an anion exchanger bed of the former mentioned class, to restore to the wine the normal acidity of 3-4 pH, by removing the slight excess of undesirable acidity as outlined in the terminal phase of Example 1.

In order to prevent fortuitous introduction of any sort of heavy-metal cations in the process, even those possibly occurring or introduced by plant material in the regeneration liquids, the whole plant in which the process is carried out, as well as all its accessories, as tubing, ventiles stop-cocks, pumps, flow-meters, has to be made of heavy-metal free substances such as plastics, ceramic, glass, etc., or has to be lined with such material. The plant has to contain adequate flow-meters to control contact time. Rubber is to be avoided, giving a bad odor to the processed liquids.

Having thus disclosed the invention, what is claimed is:

1. A process for the purification, clarification and stabilization of fermentable fruit juices in a stage prior to the aging of said fruit juices, said fruit juices containing as impurities, precipitable potassium bitartrate, precipitable calcium ions, heavy metal ions, bisulfite salts and aliphatic carboxylic acids comprising passing said impure fruit juice through a synthetic cation exchanger selected from the class consisting of after-sulfonated polystyrene cross linked with up to 10% divinyl benzene, after-sulfonated polystyrene crossed linked with allyl esters of unsaturated dicarboxylic acids and polyvinyl sulfonates obtained by the oxidation of copolymers of alkoyl vinyl sulfides and sulfones, said fruit juice passed rapidly through a bed of said cation exchanger to substantially remove the heavy metal ions therefrom and to remove precipitable potassium bitartrate and precipitable calcium ions therefrom so as to provide a molar ratio of potassium to calcium ions of about 4 to 1 to produce a stabilized fruit juice having a pH of about 2, which pH is lower than that of the starting fruit juice, whereafter said treated fruit juice is passed rapidly through a bed of a synthetic resin anion exchanger selected from the class consisting of ternary alkenyl ammonium polystyrene, quaternary alkenyl ammonium polystyrene mixtures of ternary alkenyl ammonium polystyrene crossed linked with alkylaminopolystyrene and a mixture of quaternary alkenyl ammonium polystyrene cross linked with alkylaminopolystyrene to remove from said fruit juice the aliphatic carboxylic acid impurities and bisulfite impurities therefrom and to provide a pH of between about 3 and 4.

2. A process as in claim 1 wherein the cation exchange resin is after-sulfonated polystyrene cross linked with up to 10% divinyl benzene.

3. A process as in claim 1 wherein the anion exchanger is a mixture of quaternary alkenyl ammonium polystyrene cross linked with alkylaminopolystyrene.

GEORGES DELMOUSÉE.
GEZA VICTOR AUSTERWEIL.
GEORGES LEMOUSSU.
JEAN CLAUDE POUPINEL.

References Cited in the file of this patent

UNITED STATES PATENTS

| Number | Name | Date |
|---|---|---|
| 2,104,501 | Adams et al. | Jan. 4, 1938 |
| 2,151,883 | Adams et al. | Mar. 28, 1939 |
| 2,155,318 | Liebnecht | Apr. 18, 1939 |
| 2,206,007 | Liebnecht | June 25, 1940 |
| 2,251,234 | Swain | July 29, 1941 |
| 2,253,061 | Cole | Aug. 19, 1941 |

OTHER REFERENCES

"Information Sheet on Recovery of Tartrates From Grape Wastes." Paper A1C–14, August 1943, Agricultural Research Administration, U. S. Dept. of Agriculture.